United States Patent [19]

Hosaka et al.

[11] Patent Number: 5,462,995

[45] Date of Patent: Oct. 31, 1995

[54] HYDROGENATED PRODUCTS OF THERMOPLASTIC NORBORNENE POLYMERS, THEIR PRODUCTION, SUBSTRATES FOR OPTICAL ELEMENTS OBTAINED BY MOLDING THEM, OPTICAL ELEMENTS AND LENSES

[75] Inventors: Tohru Hosaka; Hideharu Mizuno; Yuji Koushima, all of Yokohama; Teiji Kohara, Kawasaki; Tadao Natsuume, Yokosuka, all of Japan

[73] Assignee: Nippon Zeon Co., Ltd., Tokyo, Japan

[21] Appl. No.: 146,101

[22] PCT Filed: Jun. 9, 1992

[86] PCT No.: PCT/JP92/00737

§ 371 Date: Nov. 16, 1993

§ 102(e) Date: Nov. 16, 1993

[87] PCT Pub. No.: WO92/22590

PCT Pub. Date: Dec. 23, 1992

[30] Foreign Application Priority Data

Jun. 11, 1991 [JP] Japan ................ 3-165170
Aug. 12, 1991 [JP] Japan ................ 3-225290

[51] Int. Cl.$^6$ .................... B32B 3/00; C08F 32/00
[52] U.S. Cl. ................ 525/332.1; 525/338; 525/339; 428/913; 428/64.4; 430/270; 430/495; 430/945
[58] Field of Search ............... 428/64, 65, 913; 525/338, 332.1, 185; 430/270, 945

[56] References Cited

U.S. PATENT DOCUMENTS

| | | | |
|---|---|---|---|
| 4,876,525 | 3/1989 | Rempel et al. | 525/338 |
| 5,053,471 | 10/1991 | Goto et al. | 526/281 |
| 5,115,041 | 5/1992 | Tenney et al. | 525/332.1 |
| 5,202,388 | 4/1993 | Iio et al. | 525/338 |
| 5,240,998 | 8/1993 | Fasulo et al. | 525/66 |
| 5,244,706 | 9/1993 | Hirata et al. | 428/64 |
| 5,276,098 | 1/1994 | Kohara et al. | 525/185 |
| 5,290,877 | 3/1994 | Yamaoka et al. | 525/329.5 |
| 5,334,424 | 8/1994 | Hani et al. | 428/1 |

FOREIGN PATENT DOCUMENTS

| | | |
|---|---|---|
| 0395885 | 11/1990 | European Pat. Off. |
| 0405843 | 1/1991 | European Pat. Off. |
| 0436372 | 7/1991 | European Pat. Off. |
| 1-311120 | 12/1989 | Japan |
| 3-66725 | 3/1991 | Japan |
| 3-106904 | 5/1991 | Japan |

OTHER PUBLICATIONS

Patent Abstracts of Japan, vol. 9, No. 138 (C–296) (1861) Jun. 13, 1985, Abstract of JP–A–60–26024 (Nippon Zeon K.K.) Feb. 8, 1985.

*Primary Examiner*—Patrick J. Ryan
*Assistant Examiner*—Elizabeth Evans
*Attorney, Agent, or Firm*—Armstrong, Westerman, Hattori, McLeland & Naughton

[57] ABSTRACT

The present invention provides the hydrogenated product of a thermoplastic norbornene polymer excellent in characteristics as optical materials by reducing the residual amounts of the transition metal atoms originating from the polymerization catalyst used at the polymerization to 1 ppm or less of the hydrogenated product.

Reduction of the residual amounts to below the desired level is attained by treating the reaction solution with the adsorbent during or after production of the hydrogenated product from the thermoplastic norbornene polymer.

The hydrogenated product of the thermoplastic norbornene polymer thus obtained in which the residual amounts of the transition metal atoms are 1 ppm or less, has a wide utilization field, including a material for optical articles having excellent utilization characteristics such as substrates for optical elements, lenses and the like.

15 Claims, No Drawings

HYDROGENATED PRODUCTS OF THERMOPLASTIC NORBORNENE POLYMERS, THEIR PRODUCTION, SUBSTRATES FOR OPTICAL ELEMENTS OBTAINED BY MOLDING THEM, OPTICAL ELEMENTS AND LENSES

TECHNICAL FIELD

The present invention relates to the hydrogenated product of a thermoplastic norbornene polymer excellent in light transmittance, adhesion to metallic films, etc., a method for producing them, a substrate for optical elements obtained by molding them, an optical element and a lens.

BACKGROUND ART

Recently, materials having a high light transmittance are required as optical materials. Particularly, as to a material for lenses, those having a light transmittance of 90% or more over the whole wavelength region of 400 nm to 700 nm when formed into injection-molded articles of 3 mm in thickness are considered to be desirable. That is, when the material is inferior in transmittance to a part of visible rays, a lens produced from it takes a color. Further, when the lens is used near to a strong light source, the energy of that part of visible rays of the wavelength is absorbed in the lens, converted to heat in the lens, and as a result the temperature of the lens becomes high. Therefore, there is a danger of the lens melting even if it is produced with materials which are to some degree high in heat resistance.

Hitherto known resins used as optical materials include polymethyl methacrylate (PMMA) and polycarbonate (PC). Among these, PMMA is excellent in transparency, and when formed into injection-molded articles of 3 mm in thickness, its light transmittance reaches 90% and 91% at wavelengths of 430 nm and 700 nm, respectively. PMMA, however, has a problem in terms of heat resistance and humidity resistance. On the other hand, PC is superior to PMMA in heat resistance and humidity resistance, but when formed into the same injection-molded articles as above, its light transmittance is at most about 86% at a wavelength of 430 nm. Further, when it is molded into lenses, there is a problem of birefringence being large.

Recently, the hydrogenated product of a thermoplastic norbornene polymer has attracted attention as an optical material excellent in heat resistance, humidity resistance and low birefringence. However, the hydrogenated product of a thermoplastic norbornene polymer produced by the conventional methods was only such that when formed into injection-molded articles of 3 mm in thickness, its light transmittance is less than 90% at a wavelength of 430 nm, although its light transmittance is 90% or more at a wavelength of 700 nm. Further, when an optical element for information recording media is produced by vapor-depositing a metallic film onto a substrate made of the hydrogenated product of a thermoplastic saturated norbornene poller, there is a case where adhesion of the metallic film to the substrate is not always sufficient as can be seen in the generation of blister owing to the partial peeling-off of the metallic film under high-temperature and high-humidity conditions. Improvement of such the drawback has therefore been demanded.

As described later, the present inventors have found that the transparency and adhesion to metallic film of the hydrogenated product of a thermoplastic norbornene polymer can be improved by reducing the content of a transition metal atom present as polymerization catalyst residues in the thermoplastic norbornene polymer. The methods so far used to reduce this content include the following: A method of washing the polymer solution with a poor solvent; a method of adding a small amount of the poor solvent to the polymer itself, dissolving the polymerization catalyst in the poor solvent and separating the catalyst solution; and a method of treating the polymerization solution with an adsorbent (e.g. activated alumina, zeolite, etc.) in the presence of a compound having a hydroxy group (Japanese Patent Application Kokai No. 3-66725). If the polymerization catalyst is removed by these methods, however, the content of the transition metal atom present as polymerization catalyst residues in the polymer treated as above is about 2 ppm or more. At present, therefore, such the hydrogenated product that the content of the transition metal atom is less than about 2 ppm also has not been obtained from this thermoplastic norbornene polymer.

A method of using a heterogeneous catalyst in the hydrogenation of the thermoplastic norbornene polymer is disclosed in Japanese Patent Application Kokai No. 1-311120, No. 3-66725, etc. in which carbon, silica, alumina, titania, etc. are used as a carrier. These so far used carriers, however, are too short of pore volume and specific surface area to give an adsorbing ability to them, so that examples are not known where a heterogeneous catalyst comprising a catalytic metal supported on a carrier having a large pore volume and specific surface area was used.

DISCLOSURE OF THE INVENTION

The present inventors have extensively studied on the transparency and adhesion to metallic film of the hydrogenated product as a thermoplastic norbornene polymer. As a result, they have found that the transition metal atom originating from the polymerization catalyst remaining in trace amounts in the hydrogenated product exerts an adverse effect on the transparency and adhesion to metallic film, and also that in producing the hydrogenated product by hydrogenating the thermoplastic norbornene polymer in the presence of a solvent and hydrogenation catalyst, the transition metal atom can easily be removed from the reaction solution by treating the reaction solution witch an adsorbent during or after hydrogenation of the thermoplastic norbornene polymer, whereby the hydrogenated product having good transparency and adhesion to metallic film can be obtained.

BEST MODE FOR CARRYING OUT THE INVENTION

According to the present invention, there is provided a method for producing the hydrogenated product of a thermoplastic norbornene polymer having a small content of the transition metal atom originating from the polymerization catalyst.

(Thermoplastic norbornene polymer)

The term "norbornene" in this specification includes norbornene and its derivatives.

The thermoplastic norbornene polymer of the present invention contains as impurities polymerization catalyst used in polymerizing the norbornene monomer. Specific examples of the polymer include the ring-opening polymer of the norbornene monomer, addition polymer of the norbornene monomer, addition polymer of the norbornene monomer with an olefin, and the like.

The norbornene monomer includes for example the following: Norbornene, its alkyl and/or alkylidene derivatives such as 5-methyl-2-norbornene, 5-dimethyl-2-norbornene, 5-ethyl-2-norbornene, 5-butyl-2-norbornene, 5-ethylidene-2-norbornene, etc., and these compounds substituted with a polar group (e.g. halogen, etc.); dicyclopentadiene, 2,3-dihydrodicyclopentadiene, etc.; dimethanooctahydronaphthalene, its alkyl and/or alkylidene derivatives and these compounds substituted with a polar group (e.g. halogen, etc.) such as 6-methyl-1,4:5,8-dimethano-1,4,4a,5,6,7, 8,8a-octahydro-naphthalene, 6-ethyl-1,4:5,8-dimethano-1, 4,4a, 5,6,7,8,8a-octahydronaphthalene, 6-ethylidene-1, 4;5,8-dimethano-1,4,4a,5,6,7,8,8a-octahydronaphthalene, 6-chloro-1, 4:5,8-dimethano-1,4,4a,5,6,7,8,8a-octahydronaphthalene, 6-cyano-1,4:5,8-dimethano-1, 4,4a,5,6,7,8, 8a-octahydronaphthalene, 6-pyridyl-1, 4:5,8-dimethano-1,4, 4a,5,6,7,8,8a-octahydronaphthalene, 6-methoxycarbonyl-1, 4:5,8-dimethano-1, 4,4a,5,6,7,8,8a-octahydronaphthalene, etc.; the adducts of cyclopentadiene with tetrahydroindene, etc.; the trimer to tetramer of cyclopentadiene such as 4,9:5,8-dimethano-3a,4,4a,5,8,8a,9,9a-octahydro-1H-benzoindene, 4,11:5,10:6,9-trimethano-3a,4,4a,5,5a,6,9,9a,10, 10a, 11,11a-dodecahydro- 1H-cyclopentaanthracene, and the like.

(Polymerization method)

Usually, ring-opening polymerization of the norbornene monomer is carried out with a catalyst consisting substantially of a transition metal compound and an organometal compound of a metal belonging to Groups I to IV of the periodic table. The transition metal compound includes the halides, oxyhalides, oxides, etc. of transition metals such as titanium, molybdenum, tungsten and the like. Specifically, there are given $TiCl_4$, $TiBr_4$, $WBr_4$, $WCl_6$. $WOF_4$, $MoBr_2$, $MoCl_5$, $MoOF_4$ and the like. The organometal compound of a metal belonging to Groups I to IV includes organoaluminum compounds, organotin compounds and the like. Specifically, there are given trimethylaluminum, triphenylaluminum, ethylaluminum sesquichloride, tetrabutyltin, diethyltin diiodide, n-butyllithium, diethylzinc, trimethylboron and the like.

Addition polymerization of the norbornene monomer or the norbornene monomer with an olefin also can be carried out by ring-opening polymerization with the known transition metal catalysts according to the known methods. Usually, catalysts composed of a titanium or vanadium compound supported on a magnesium compound and an alkylaluminum compound are used. The titanium or vanadium compound supported on a magnesium compound is a composite substance containing at least magnesium, titanium and halogen. A method for producing the composite substance is disclosed for example in Japanese Patent Application Kokai No. 48-16986, No. 51-29297, No. 52-87489, No. 53-2580 and the like. The vanadium compound includes $VCl_4$, $VOBr_2$, $VO(OCH_3)_2Cl$, $VO(OC_3H_7)_3$, $VO(OC_4H_9)Cl_2$, etc. and mixtures thereof. The alkylaluminum compound includes trialkylaluminum, dialkylaluminum halide, alkylaluminum dihalide, etc. and mixtures thereof.

The polymerization is stopped after it processed until the desired molecular weight is reached. In order to stop the polymerization, the polymerization catalyst is deactivated, after which it is removed, For deactivating the polymerization catalyst, it will suffice to add a catalyst deactivator (e.g. water, alcohol, etc.) to the polymerization solution. Thus, the polymerization catalyst precipitates from the polymerization solution. Since the precipitated polymerization catalyst becomes hard and grows into a large mass by refluxing the reaction solution, it can be removed more easily. For removing the polymerization catalyst, there may be employed and of the methods such as for example centrifugation of the deactivated and precipitated polymerization catalyst, filtration of the catalyst and washing of the polymerization solution after stoppage of the reaction with large amounts of a poor solvent. Alternatively, the polymerization solution may be treated with an adsorbent (e.g. activated alumina, zeolite, etc.) in the presence of a compound having a hydroxy group. In removing the catalyst by these methods, the transition metal atom originating from the polymerization catalyst remains in the polymer in a concentration of about 2 to about 10 ppm.

(Hydrogenation)

The thermoplastic norbornene polymer can be converted to its hydrogenated product by saturating the olefin unsaturated groups contained in the polymer molecule, i.e. a double bond in the main chain and a double bond in the unsaturated ring.

The hydrogenation catalyst usable may be any of those which are commonly used in the hydrogenation of olefin compounds. For example, there are given Willkinson complexes, cobalt acetate/triethylaluminum, acetylacetonatonickel/triisobutylaluminum, etc. and heterogeneous catalysts in which a catalytic metal (e.g. nickel, palladium, platinum, etc.) has been supported on diatomaceous earth, magnesia, alumina, synthetic zeolite and the like. As described later, a preferred heterogeneous catalyst is those in which the carrier is magnesia, activated alumina or synthetic zeolite, the pore volume is 0.5 $cm^3/g$ or more, preferably 0.7 $cm^3/g$ or more, and preferably the specific surface area is 250 $m^2/g$ or more.

The hydrogenation is carried out under a hydrogen pressure of 1 to 150 atm. at a temperature of 0° C. to 280° C., preferably 20° C. to 230° C. according to the kind of the hydrogenation catalyst. For example, when a catalyst in which nickel has been supported on activated alumina is used, the temperature is preferably 200° C. to 250° C., more preferably 220° C. to 230° C. The percent hydrogenation can be optionally controlled by changing hydrogen pressure, reaction temperature, reaction time, catalyst concentration and the like.

In the present invention, hydrogenation of the thermoplastic norbornene polymer is usually carried out in an inert organic solvent. Hydrocarbon solvents are preferred as the organic solvent. Among these, cyclic hydrocarbon solvents in which the formed norbornene polymer is highly soluble are particularly preferred. Specifically, there are given aromatic hydrocarbons (e.g. benzene, toluene), aliphatic hydrocarbons (e.g. n-pentane, hexane), alicyclic hydrocarbons (e.g. cyclohexane, decalin), halogenated hydrocarbons (e.g. methylene dichloride, dichloroethane) and the like. These solvents may be used in a mixture of two or more of them. When the solvent is used, its amount used is 1 to 20 parts by weight, preferably 1 to 10 parts by weight based on 1 part by weight of the norbornene polymer.

(Removal of catalyst)

For removing the catalyst after finish of the hydrogenation, it will suffice to use the usual methods such as centrifugation, filtration and the like. Methods used for centrifugation and filtration are not critical, so far as they are carried out under conditions where the catalyst can be removed. It is preferred, however, that removal of the catalyst by filtration is simple and efficient. Filtration may be carried out by either of pressure filtration or suction filtration. Use of filtration assistants such as diatomaceous earth, perlite, etc. is preferred in terms of efficiency. As described later, adsorbents suitable for the transition metal atom originating from the polymerization catalyst may be used as the filtration assistant.

When the heterogeneous catalyst, which is the hydrogenation catalyst, contains articles having a particle size of 0.2 µm or more, not substantially particles having a particle size of less than 0.2 µm, removal of the heterogeneous catalyst by filtration is so easy that use of such the catalyst is preferred. When the particle size is too small, the particle easily leaks through a filter at the time of filtration, and also removal of the particle becomes difficult even by centrifugation, as a result of which the amount of the transition metal atom, which is the residue of the polymerization catalyst and hydrogenation catalyst, contained in the hydrogenated product of the thermoplastic norbornene polymer increases. When filtration is carried out with a filter having a small mesh size in order to prevent the leak, the filter is easily blocked to lower the operation efficiency.

(Adsorption treatment)

In the present invention, the transition metal atom originating from the polymerization catalyst is removed by treating the reaction solution of the polymer with the adsorbent during or after hydrogenation.

Adsorption treatment of the reaction solution is carried out by the following methods.

(1) The adsorbent is added to the reaction solution at the start of hydrogenation, reaction is carried out and then the hydrogenation catalyst and adsorbent are removed at the same time.

(2) The adsorbent is added to the reaction solution at the start of hydrogenation, reaction is carried out and then the adsorbent is removed, after which the hydrogenation catalyst is removed.

(3) The adsorbent is added to the reaction solution in the course of hydrogenation, reaction is carried out and then the hydrogenation catalyst and adsorbent are removed at the same time.

(4) The adsorbent is added to the reaction solution in the course of hydrogenation, reaction is carried out and then the adsorbent is removed, after which the hydrogenation catalyst is removed. Adsorption treatment after hydrogenation is carried out by the following methods.

(5) The adsorbent is added to the reaction solution after the finish of hydrogenation, stirring is carried out and then the hydrogenation catalyst and adsorbent are removed at the same time.

(6) The adsorbent is added to the reaction solution after the finish of hydrogenation, stirring is carried out and then the adsorbent is removed, after which the hydrogenation catalyst is removed.

(7) After the finish of hydrogenation, the reaction solution is passed through an adsorbent column, after which the hydrogenation catalyst is removed.

(8) After the finish of hydrogenation, the reaction solution is passed through an adsorbent column, in order to remove the hydrogenation catalyst.

(9) After removal of the hydrogenation catalyst, the reaction solution is passed through an adsorbent column.

(10) After removal of the hydrogenation catalyst, the adsorbent is added to the reaction solution, stirring is carried out thoroughly, and then the adsorbent is removed.

These methods may be used in combination. The method (8) may be modified, for example, in such a manner that the hdyrogenation catalyst is removed with the adsorbent as a filtration assistant.

Among these methods, the methods (1), (2), (3) and (4) in which adsorption treatment is carried out during hydrogenation are preferred from the standpoint of the efficiency of removal of the transition metal atom originating from the polymerization catalyst, this removal of the transition metal atom being an object of the present invention. Further, the methods (1) and (2) are preferred in terms of the length of treatment time and safety of operation. Particularly, the method (1) is very good in operation efficiency because the hydrogenation catalyst and adsorbent are removed at the same time.

The adsorbent of the present invention is not critical, so far as it can sufficiently adsorb residues resulting from the transition metal catalyst used in the polymerization and hydrogenation. Preferably, however, the adsorbent is $SiO_2$ and $Al_2O_3$ such as synthetic zeolite, natural zeolite, activated alumina, activated clay, etc. and crystalline or amorphous mixed compositions of these adsorbents. Further, these adsorbents must have a specific surface area of 50 $m^2/g$ or more, preferably 100 $m^2/g$ or more, more preferably 200 $m^2/g$ or more and a pore volume of 0.5 $cm^3/g$ or more, preferably 0.6 $cm^3/g$ or more, more preferably 0.7 $cm^3/g$ or more. When the specific surface area and pore volume are small, the adsorbing ability is inferior. The particle size of the adsorbent is 0.2 µm or more, preferably 10 µm to 3 cm, more preferably 100 µm to 1 cm. When the particle size is too small, removal of the adsorbent is difficult. While when it is too large, the degree at which the column is packed with the adsorbent is small, and also the degree at which the adsorbent is brought into contact with the transition metal catalyst residues present in the solution of the hydrogenated product is so small that the adsorbent does not adsorb the residues sufficiently.

As described above, the adsorption treatment includes:

(I) The reaction solution is passed through a column packed with the adsorbent.

(II) The adsorbent is added to the reaction solution and after stirring, the adsorbent is removed by filtration and the like.

(III) The adsorbent is added to the reaction solution at the time of hydrogenation.

As described above, the method (III) in which the adsorbent is added to the reaction solution at the time of hydrogenation is most preferred.

(I) A method of passing the reaction solution through a column packed with the adsorbent.

The foregoing methods (7), (8) and (9) correspond to this method.

When the packing rate of the column is expressed by $\rho(g/m^3)$, the specific surface area of the adsorbent is expressed by $S(m^2/g)$ and the residence time of the reaction solution is expressed by $t(sec)$, it will suffice to pass the reaction solution through the column so that $\rho(St(sec/m)$ is $10^9$ or more. Usually, S is about 100 to about 1000 $m^2/g$, and $\rho$ is about 4 to $8 \times 10^5$ $g/m^3$, it will suffice to control the residence time so as to be 30 sec or more.

In this case, treatment of a large amount of the hydrogenation solution lowers the adsorbing ability, so that the treatment time needs to be prolonged. Further, it adsorption of the adsorbent reaches saturation, the adsorbent does not adsorb the solution further more. Therefore, at a point then the concentration of the transition metal atom, the polymerization catalyst residues, contained in the reaction solution after adsorption treatment begins to increase, the column needs to be re-packed with the fresh adsorbent.

(II) A method of adding the adsorbent after hydrogenation.

The foregoing methods (5), (6) and (10) correspond to this method.

When the specific surface area of the adsorbent is expressed by $S(m^2/g)$, the amount of the adsorbent added is expressed by $m(g)$, the stirring time of the reaction solution is expressed by t(sec), the amount of the reaction solution to be treated is expressed by V(g), and the concentration of the hydrogenated product in the reaction solution is expressed by c, it will suffice to add the adsorbent to the reaction solution and stir the solution so that Smt/Vc(sec/m) is $10^3$ or more, preferably $10^4$ or more, more preferably $10^5$ or more, Sm/Vc is 1 or more, preferably 3 or more, particularly preferably 5 or more, and t(sec) is 100 or more, preferably 200 or more, more preferably 300 or more. The stirring time needs to be prolonged depending upon stirring efficiency, but in reality the stirring efficiency is so difficult to control that it is desirable to prolong the stirring time, so far as the overall efficiency of the operation permits.

Usually, S is about 100 to about 1000 $m^2/g$, and therefore when the concentration of the hydrogenated product in the reaction solution is 10%, it will suffice, for example, to add the adsorbent of 10 g or more based on 1 Kg of the reaction solution and thoroughly stir the solution for 100 seconds or more.

(III) A method Of adding the adsorbent at the time of hydrogenation.

The foregoing methods (1), (2), (3) and (4) correspond to this method. This method is the most preferred embodiment of the present invention. In this case, the adsorbent adsorbs impurities such as gelled resins, etc. at the same time, so that a reduction in the catalytic activity owing to adsorption of impurities by the hydrogenation catalyst is low. Therefore, the hydrogenation can be kept highly active.

The treatment conditions are basically the same as those of the method (II). However, in the cases of the methods (I) and (II) in which the adsorbent is added particularly at the start of hydrogenation, the stirring time in the method (III) becomes long because the hydrogenation time is the stirring time at the same time. Therefore, it will usually suffice to take Sm/Vc alone into account.

In the case of the method (I), it is likewise desirable to use as the hydrogenation catalyst the heterogeneous catalyst in which the catalytic metal has been supported on the adsorbent of the present invention. For example, the heterogeneous catalyst used in the present invention includes those in which the catalytic metal (e.g. nickel, palladium, platinum) has been supported on magnesia, activated alumina, synthetic zeolite or the like having a pore volume of 0.5 $cm^3/g$ or more, preferably 0.7 $cm^3/g$ or more, and preferably a specific surface area of 250 $m^2/g$ or more. Particularly, activated alumina and synthetic zeolite having an excellent ability to adsorb impurities are preferred.

For producing the heterogeneous catalyst, it will suffice to follow the known methods. And also, it will suffice to control the adsorbing ability of the carrier according to the conditions of drying and calcination described in Japanese Patent Application Kokoku No. 50-14575, No. 49-32187, No. 49-11312, No. 51-48479 and the like. For example, the heterogeneous catalyst in which nickel has been supported on activated alumina is obtained as follows: An aluminum hydroxide powder is suspended in a 10 to 20% aqueous nickel sulfate solution so that its concentration is 10 to 20%; sodium hydroxide is added to the solution to hydrolyze nickel sulfate, whereby the resulting nickel hydroxide is supported on the surface of aluminum hydroxide; this aluminum hydroxide powder is recovered by filtration, hardened into a mass by extrusion and calcined at 350° C. to 450° C.; the calcined mass is brought into contact with hydrogen at 100° C. to 200° C. to reduce the surface, and then heated at 80° C. to 120° C. in the presence of oxygento oxidize the surface of the metal. Thus, an oxide film is formed to obtain a nickel catalyst supported on activated alumina. In this case, the surface of nickel is covered with nickel oxide, which is however converted to nickel by reduction in the hydrogenation system to function as a catalyst.

Since the fine structure of activated alumina changes depending upon the extrusion condition, calcination temperature, pressure and the like, the above conditions need to be selected so that the pore volume is 0.5 $cm^3/g$ or more, preferably 0.7 $cm^3/g$ or more, and preferably the specific surface area is 250 $m^2/g$ or more. When hydrogenation is carried out at a high temperature, it will suffice to select desirable conditions by properly regulating the oxidation temperature, oxidation time and oxygen concentration, taking into account that the larger the thickness of the oxide film, the higher the heat resistance of the film. The calcined product thus obtained is pulverized to obtain the heterogeneous catalyst.

(Hydrogenated product of the thermoplastic norbornene polymer)

The hydrogenated product of the thermoplastic norbornene polymer of the present invention, like the conventional ones, is not only excellent in heat resistance, resistance to deterioration by heat and light, humidify resistance, chemical resistance and the like, but has a small content of the transition metal atom originating from the polymerization catalyst. Because of this, the hydrogenated product of thermoplastic norbornene polymer of the present invention is excellent in transparency as compared with the conventional ones. And also, for example, optical elements for information recording medium having a metallic reflecting film or metallic recording film produced with the above hydrogenated product of the present invention have a good adhesion to metallic films, as can be seen in that blisters are difficult to appear even in high-temperature and high-humidity conditions.

(Additives)

The hydrogenated product of thermoplastic norbornene polymer of the present invention can also be used as resin compositions, if necessary, by blending known additives. The additives include for example antioxidants, light stabilizers, ultraviolet ray absorbers, lubricants, plasticizers, flame retardants, antistatic agents, heat stabilizers, hydrogenated petroleum resins, dyes, pigments, inorganic and organic fillers and the like.

(Molding)

The hydrogenated product of thermoplastic norbornene polymer of the present invention can be molded into a substrate for optical elements by the usual method. The molding method is not critical, and the usual plastics molding methods such as injection molding, extrusion molding, compression molding the like can be applied.

Optical elements for information recording medium are obtained by forming an information recording film layer on the substrate for optical elements obtained by molding the hydrogenated product of thermoplastic norbornene polymer of the present invention. The information recording film layer is usually formed with a metallic film as a metallic reflecting film or metallic recording film. Thus, optical elements for information recording medium such as discs for optical recording medium and cards for optical recording medium can be produced. Formation of the metallic reflecting film is carried out by vapor-depositing a metal having a high reflectance such as nickel, aluminum, gold and the like. Formation of the metallic recording film is carried out by vapor-depositing a Tb-Fe-Co alloy, etc. commonly used for the formation of magneto-optical recording films. A method for vapor-depositing a metallic film onto the substrate for optical elements also is not critical, and the usual vapor deposition methods such as vacuum deposition, sputtering and the like can be applied.

Plastic lenses can be formed by the known injection molding methods described, for example, in Japanese Patent Application Kokai No. 60-141518, No. 60-225722, No. 61-144316 and the like.

Other optical elements such as Fresnel lens, etc. can be produced by adhering an optical element pattern to the substrate for optical elements by the known methods.

WORKING EXAMPLE

The present invention will be illustrated specifically with reference to the following referential examples, examples and comparative examples.

Referential Example 1

Sixty parts by weight of 6-ethyl-1, 4:5,8-dimethano-1,4, 4a,5,6,7,8,8a-octahydronaphthalene was dissolved in 200 parts by weight of cyclohexane, and 1 part by weight of 1-hexene was added as a molecular weight-regulating agent. To this solution were added 10 parts by weight of a 15% cyclohexane solution of triethylaluminum as a polymerization catalyst, 5 parts by weight of triethylamine and 10 parts by weight of a 20% cyclohexane solution of titanium tetrachloride to start ring-opening polymerization at 30° C.

At a point when the conversion of the monomer to the polymer reached 85% 30 minutes after beginning of the polymerization, a 5% cyclohexane solution of tungsten hexachloride was added. As a result of stirring for further 30 minutes, the conversion of the monomer to the polymer reached 100%.

To the cyclohexane solution of this polymer were successively added 0.9 part by weight of isopropyl alcohol and 7 parts by weight of ion-exchanged water, and the resulting mixture was refluxed at 80° C. for 1 hour. As a result, the polymerization catalyst was hydrolyzed to turn heterogeneous component which separated from the polymer solution. This component was removed by pressure-filtering the solution with diatomaceous earth (Radiolite #800 produced by Showa Kagaku Co.) as a filter layer to obtain a colorless and transparent solution. Volatile components were removed from a part of this solution to obtain a polymer having a number average molecular weight of 25,000 converted to a polystyrene basis by gelpermeation chromatography.

Ten parts by weight of this ring-opening polymer was dissolved in 90 parts by weight of cyclohexane, and the concentration of the titanium atom, which is the residue of the transition metal catalyst, was measured by atomic absorption analysis to find that the concentration was 5 ppm based on the ring-opening polymer.

Example 1

A heterogeneous catalyst having a pore volume of 0.8 $cm^3/g$ and a specific surface area of 300 $m^2/g$ in which 0.35 g of nickel and 0.2 g of nickel oxide, each being a weight per 1 g of the catalyst, were supported on activated alumina used as a carrier, was sieved with a 150-mesh sieve, and a fraction having a larger particle size was selected to obtain the catalyst having a minimum particle size of 0.2 μm or more. The 20% cyclohexane solution of the polymer obtained in Referential Example 1 was put in a pressure-proof reactor, and the above catalyst of 2 wt. % based on the polymer was added. Hydrogenation was carried out at a temperature of 230° C. for 3 hours under a hydrogen pressure of 45/$cm^2$.

Thereafter, the reaction solution was filtered through a 10 double filter layer comprising the upper layer of diatomaceous earth (Radiolite #800 produced by Showa Kagaku Co.) and the lower layer of diatomaceous earth (Radiolite #300 produced by Showa Kagaku Co.). The filtrate obtained was successively filtered through a cartridge filter having a mesh size of 0.5 and a cartridge filter having a mesh size of 0.2 μm to remove the catalyst. Thereafter, volatile components in the resulting filtrate were removed with a vertical cylindrical concentrator to obtain the hydrogenated product of the thermoplastic norbornene polymer. This hydrogenated product was confirmed to have a percent hydrogenation of nearly 100% by $^1$H-NMR.

Ten parts by weight of this hydrogenated product of the ring-opening polymer was dissolved in 90 parts by weight of cyclohexane, and the concentrations of the titanium and nickel atoms were measured by atomic absorption analysis to find that both of them were below 1 ppm, a detection limit, based on the hydrogenated product.

Example 2

A heterogeneous catalyst having a pore volume of 0.8 $cm^3/g$ and a specific surface area of 300 $m^2/g$ in which 0.35 g of nickel and 0.2 g of nickel oxide, each being a weight per 1 g of the catalyst, were supported on molecular sieves used as a carrier, was sieved with a 50-mesh sieve, and a fraction having a larger particle size was selected to obtain the catalyst having a minimum particle size of 0.2 μm or more. The 20% cyclohexane solution of the polymer obtained in Referential Example 1 was put in an autoclave, and the above catalyst of 2 wt. % based on the polymer was added. Hydrogenation was carried out at a temperature of 230° C. for 3 hours under a hydrogen pressure of 45 kg/$cm^2$. Thereafter, the reaction solution was filtered through a double filter layer comprising the upper layer of diatomaceous earth (Radiolite #800) and the lower layer of diatomaceous earth (Radiolite #300). The filtrate obtained was successively filtered through a cartridge filter having a mesh size of 0.5 μm and a cartridge filter having a mesh size of 0.2 μm to remove the catalyst. Thereafter, volatile components in the resulting filtrate were removed with a vertical cylindrical concentrator to obtain the hydrogenated product of the thermoplastic norbornene polymer. This hydrogenated product was confirmed to have a percent hydrogenation of nearly 100% by $^1$H-NMR.

Ten parts by weight of this hydrogenated product of the ring-opening polymer was dissolved in 90 parts by weight of cyclohexane, and the concentrations of the titanium and nickel atoms were measured by atomic absorption analysts to find that both of them were below 1 ppm, a detection limit, based on the hydrogenated product.

Comparative Example 1

A nickel catalyst in which nickel has been supported on diatomaceous earth used as a carrier (N-113 produced by Nikki Kagaku Co.; amounts of nickel and nickel oxide supported, 0.35 g and 0.2 g, respectively, per 1 g of the catalyst; pore volume, 0.2 to 0.3 $cm^3/g$; and specific surface area, 100 $m^2/g$) was sieved with a 150-mesh sieve, and a fraction having a larger particle size was selected to obtain the catalyst having a minimum particle size of 0.2 μm or more.

The 20% cyclohexane solution of the polymer obtained in Referential Example 1 was put in a pressure proof reactor, the above nickel catalyst of 5 wt. % based on the polymer was added, and then isopropyl alcohol of 2 wt. % based on the cyclohexane solution was added for activation of the catalyst. Hydrogenation was carried out at a temperature of 190° C. for 3 hours under a hydrogen pressure of 45 kg/cm$^2$, and thereafter a part of the reaction solution was sampled and hydrogenated for further 2 hours. Each of the 3-hour and 5-hour reaction solutions was filtered through a double filter layer comprising the upper layer of diatomaceous earth (Radiolite #800) and the lower layer of diatomaceous earth (Radiolite #300). Thereafter, each filtrate obtained was successively filtered through a cartridge filter having a mesh size of 0.5 μm and a cartridge filter having a mesh size of 0.2 μm to remove the catalyst. Thereafter, volatile components in the resulting filtrate were removed with a vertical cylindrical concentrator to obtain the hydrogenated product of the thermoplastic norbornene polymer. It was confirmed by $^1$H-NMR that the percent hydrogenations of the 3-hour and 5-hour hydrogenated products were about 85% and nearly 100%, respectively.

Ten parts by weight of the above hydrogenated product having a percent hydrogenation of nearly 100% was dissolved in 90 parts by weight of cyclohexane, and atomic absorption analysis was carried out to find that the concentrations of the titanium and nickelatoms, which are the residue of the transition metal catalyst, were 2 ppm and 400 ppm, respectively, based on the hydrogenated product.

Example 3

The hydrogenated product obtained in Example 1 was molded into a substrate for optical disc having a 1 thickness of 1.2 mm and a diameter of 130 mm with an injection molding machine (DISK Model S-3M produced by Sumitomo Heavy Industries, Ltd.) at a mold temperature of 110° C. and an injection temperature of 300° C. Metallic aluminum was vacuum-deposited on this substrate, and the resulting aluminum-deposited substrate was subjected to a high-temperature and high-humidity test under conditions of 70° C.×90% (humidity)×24 hours. As result, abnormalities such as blister, etc. were not observed in adhesion of the metallic aluminum film to the substrate.

Comparative Example 2

A substrate for optical disc was prepared in the same manner as in Example 3 except that the hydrogenated product obtained in Comparative Example 1 was used in place of the hydrogenated product obtained in Example 1. Similarly, metallic aluminum was vacuum-deposited on this substrate, and the resulting aluminum-deposited substrate was subjected to the high-temperature and high-humidity test. As a result, adhesion was a problem as was observed a blister between the metallic aluminum film and substrate.

Example 4

The hydrogenated product obtained in Example 1 was molded into a lens for projection TV having a thickness of 3 mm with an injection molding machine (DISK Model 5-3M produced by Sumitomo Heavy Industries, Ltd.) at a mold temperature of 145° C. and an injection temperature of 290° C. After injection molding, the lens was cooled to 90° C. in 6 minutes. The light transmittance of this lens was measured with a spectrophotometer to find that it was 90% or more over the whole wavelength region of 400 nm to 700 nm, being 90.4% even at the lowest.

Comparative Example 3

A lens was prepared in the same manner as in Example 4 except that the hydrogenated product obtained in Comparative Example 1 was used in the place of the hydrogenated product obtained in Example 1. The light transmittance of this lens in the region of 400 nm to 450 nm was 88% or less, being 87.9% even at the highest.

Referential Example 2

To a separable flask thoroughly dried and replaced by a nitrogen gas in the inside were added 27 g of 6-ethylidene-2-tetracyclododecane, and 1-hexene and toluene in proportions of 3 mmoles and 120 ml, respectively, based on 27 g of the former.

Further, 3.0 mmoles of triethylaluminum, 0.60 mmole of titanium tetrachloride and 3.0 mmoles of triethylamine were added, and ring-opening polymerization was carried out with stirring at 25° C. for 4 hours. After adding 140 g of distilled water, the reaction solution was stirred for 1 hour to carry out washing of the solution. Thereafter, a mixed solvent comprising the same amounts of acetone and isopropyl alcohol was added to precipitate the ring-opening polymer which was then filtered off and dried.

This ring-opening polymer had a molecular weight of 24,000 and a Tg of 146° C.

Ten parts by weight of this dried ring-opening polymer was dissolved in 90 parts by weight of cyclohexane, and the concentration of the titanium atom, which is the residue of the transition metal catalyst, in the solution was measured by atomic absorption analysis to find that the concentration was 37 ppm based on the ring-opening polymer.

Referential Example 3

Ten grams of the ring-opening polymer obtained in Referential Example 2 and 100 ml of cyclohexane were mixed to prepare a solution, and 1 g of palladium carbon was added thereto.

The resulting mixture was mixed in a stainless steel ampoule, and air in the ampoule was replaced by hydrogen to a hydrogen pressure of 50 kg/cm$^2$G. The ampoule was kept at 10° C. for 30 minutes with stirring. Thereafter, the temperature was raised to 120° C. and kept at the same temperature for 18 hours to finish hydrogenation. After adding 100 g of distilled water, the reaction solution was stirred for 1 hour to carry out washing of the solution. Thereafter, a mixed solvent comprising the same amounts of acetone and isopropyl alcohol was added to precipitate the hydrogenated product of the ring-opening polymer which was then filtered off and dried.

This hydrogenated product had a percent hydrogenation of 99.7% and a Tg of 140° C.

Ten parts by weight of this dried hydrogenated product was dissolved in 90 parts by weight of cyclohexane, and the concentrations of the titanium and palladium atoms, which are the residue of the transition metal catalyst, in the solution were measured by atomic absorption analysis to find that the concentrations were 9 ppm and 4 ppm, respectively, based on the hydrogenated product.

Example 5

Ten grams of the polymer obtained in Referential Example 2 and 100 ml of cyclohexane were mixed to prepare a solution, and 1 g of palladium carbon and 0.3 g of activated alumina (Neo-bead D powder produced by Mizusawa Kagaku Co.; specific surface area, 320 m²/g; pore volume, 0.8 cm³/g; and average particle size, 15 μm) were added thereto. The resulting mixture was mixed in a stainless steel ampoule, and air in the ampoule was replaced by hydrogen to a hydrogen pressure of 50 kg/cm²G. The ampoule was kept at 10° C. for 30 minutes with stirring. Thereafter, the temperature was raised to 120° C. and kept at the same temperature for 18 hours to finish hydrogenation. The reaction solution was filtered to remove the palladium carbon and activated alumina, and to the filtrate was added a mixed solvent comprising the same amounts of acetone and isopropyl alcohol to precipitate the hydrogenated product of the ring-opening polymer which was then filtered off and dried.

This hydrogenated product had a percent hydrogenation of 99.7% and a Tg of 140° C.

Ten parts by weight of this dried hydrogenated product was dissolved in 90 parts by weight of cyclohexane, and the concentrations of the titanium and palladium atoms, which are the residue of the transition metal catalyst, in the solution were measured by atomic absorption analysis to find that both of them were below 1 ppm of a detection limit based on the hydrogenated product.

Example 6

Ten parts by weight of the hydrogenated product obtained in Referential Example 3 was dissolved in 90 parts by weight of cyclohexane. A column of 3 cm in radius and 100 cm in height was packed with activated alumina (Neo-based D pellet produced by Mizusawa Kagaku Co.; specific surface area, 350 m²/g; pore volume, 0.8 cm³/g; and particle size, about 3 mm) in a packing rate of $5.0 \times 10^5$ g/m³. Thereafter, the solution obtained above was passed through the column so that the residence time was 100 seconds. Using the solution flowing out of the column, the concentrations of the titanium and palladium atoms, which are the residue of the transition metal catalyst, in the solution were measured by atomic absorption analysis to find that both of them were below 1 ppm of a detection limit based on the hydrogenated product.

Example 7

Ten parts by weight of the hydrogenated product obtained in Referential Example 3 was dissolved in 90 parts by weight of cyclohexane. A column of 3 cm in radius and 100 cm in height was packed with synthetic zeolite (Mizuka Sieves-13X produced by Mizusawa Kagaku Co.; specific surface area, 500 m²/g; pore volume, 1.2 cm³/g; and particle size, about 1.8 mm) in a packing rate of $8.8 \times 10^5$ g/m³. Thereafter, the solution obtained above was passed through the column so that the residence time was 100 seconds. Using the solution flowing out of the column, the concentrations of the titanium and palladium atoms, which are the residue of the transition metal catalyst, in the solution were measured by atomic absorption analysis to find that both of them were below 1 ppm of a detection limit based on the hydrogenated product.

Example 8

Ten parts by weight of the hydrogenated product obtained in Referential Example 3 was dissolved in 90 parts by weight of cyclohexane. Three hundred grams of the resulting solution was put in a 1-liter beaker of 10 cm in radius, and 6 g of activated alumina used in Example 1 was added thereto. Thereafter, a cylindrical Teflon stirrer chip of 3 cm in length was put in the beaker and stirred at 100 rpm for 60 minutes by means of a magnetic stirrer.

Activated alumina was removed by filtration. Thereafter, using the resulting filtrate, the concentrations of the titanium and palladium atoms, which are the residue of the transition metal catalyst, in the filtrate were measured by atomic absorption analysis to find that both of them were below 1 ppm of a detection limit based on the hydrogenated product.

Example 9

The hydrogenated products obtained in Examples 5 to 8 were each molded into a substrate for optical disc having a thickness of 1.2 mm and a diameter of 130 mm with an injection molding machine (DISK Model 5-3M produced by Sumitomo Heavy Industries, Ltd.) at a mold temperature of 110° C. and an injection temperature of 300° C. Metallic aluminum was vacuum-deposited on these substrates, and the resulting aluminum-deposited substrates were each subjected to a high-temperature and high-humidity test under conditions of 70° C.×90% (humidity)×24 hours. As a result, abnormalities such as blister, etc. were not observed in adhesion of the metallic aluminum film to the substrates.

Comparative Example 4

A substrate for optical disc was prepared in the same manner as in Example 9 except that the hydrogenated product obtained in Referential Example 3 was used in place of the hydrogenated product obtained in Example 5. Similarly, metallic aluminum was vacuum-deposited on this substrate, and the resulting product was subjected to the high-temperature and high-humidity test. As a result, adhesion was a problem as was observed a blister between the metallic aluminum film and substrate.

Example 10

The hydrogenated products obtained in Examples 5 to 8 were each molded into a lens for projection TV having a thickness of 3 mm with an injection molding machine (DISK Model 5-3M produced by Sumitomo Heavy Industries, Ltd.) at a mold temperature of 145° C. and an injection temperature of 290° C. After injection molding, the lens was cooled to 90° C. in 6 minutes. The light transmittance of these lenses was measured with a spectrophotometer to find that it was 90% or more for any lens over the whole wavelength region of 400 nm to 700 nm, and also that it was 90.6%, 90.5%, 90.2% and 90.4%, respectively, even at the lowest. Particularly, the lens produced with the hydrogenated product obtained in Example 1 had the highest light transmittance over the whole wavelength region of 400 nm to 700 nm.

Comparative Example 5

A lens was prepared in the same manner as in Example 10 except that the hydrogenated product obtained in Referential Example 3 was used in place of the hydrogenated products obtained in Examples 5 to 8. The light transmittance of this lens in the region of 400 nm to 450 nm was 90% or less, being 89.0% even at the highest.

<Industrial Applicability>

The resin produced by the method of the present invention, although its heat resistance, humidity resistance and the like are not different from those of the conventional thermoplastic norbornene resins, has an improved transparency, and also its injection-molded product of 3 mm in thickness shows a transmittance of 90% or more to a light of 430 nm in wavelength, so that this resin is suitable as a material for optical elements requiring transparency. Further, the content of any transition metal atom originating from the polymerization catalyst of the resin is 1 ppm or less, so that adhesion of the optical element produced with this resin to metallic film, etc. is good. Therefore, it can be expected that this resin is utilized as a material for optical articles having a high reliability.

We claim:

1. The hydrogenated product of a thermoplastic norbornene polymer of which the content of any transition metal atom originating from the polymerization catalyst is 1 ppm or less.

2. A substrate for optical elements obtained by forming the hydrogenated product of a thermoplastic norbornene polymer according to claim 1.

3. An optical element for information recording media obtained by depositing an information recording film on the substrate for optical elements according to claim 2.

4. An optical element obtained by depositing an optical element pattern on the substrate for optical elements according to claim 2.

5. A lens obtained by forming the hydrogenated product of a thermoplastic norbornene polymer according to claim 1.

6. In a method for producing a hydrogenated product of a thermoplastic norbornene polymer by hydrogenating the thermoplastic norbornene polymer in solution in a solvent and in the presence of a hydrogenation catalyst, the improvement which comprises treating the solution with an adsorbent having a pore volume of 0.5 cm$^3$/g or more during or after hydrogenation of the thermoplastic norbornene polymer.

7. A method according to claim 6, wherein the adsorbent is activated alumina or synthetic zeolite.

8. A method according to claim 6, wherein the surface area of the adsorbent is 50 m$^2$/g or more.

9. A method according to claim 6, wherein the pore volume of the adsorbent is 0.6 cm$^3$/g or more and the specific surface area of the adsorbent is 100 m$^2$/g or more.

10. A method according to claim 6, wherein the pore volume of the adsorbent is 0.7 cm$^3$/g or more and the specific surface area of the adsorbent is 200 m$^2$/g or more.

11. In a method for producing a hydrogenated product of a thermoplastic norbornene polymer by hydrogenating the thermoplastic norbornene polymer in solution in a solvent and in the presence of a solvent and a hydrogenation catalyst, the improvement which comprises hydrogenating the thermoplastic norbornene polymer with the hydrogenation catalyst supported on a adsorbent having a pore volume of 0.5 cm$^3$/g or more.

12. A method according to claim 11, wherein the adsorbent is activated alumina or synthetic zeolite.

13. A method according to claim 11, wherein the surface area of the adsorbent is 50 m$^2$/g or more.

14. A method according to claim 11, wherein the pore volume of the adsorbent is 0.6 cm$^3$/g or more and the specific surface area of the adsorbent is 100 m$^2$/g or more.

15. A method according to claim 11, wherein the pore volume of the adsorbent is 0.7 cm$^3$/g or more and the specific surface area of the adsorbent is 200 m$^2$/g or more.

* * * * *

UNITED STATES PATENT AND TRADEMARK OFFICE
CERTIFICATE OF CORRECTION

PATENT NO.:     5,462,995
DATED:          October 31, 1995
INVENTOR(S):    HOSAKA et al.

It is certified that error appears in the above-identified patent and that said Letters Patent is hereby corrected as shown below:

Column 15, line 10, claim 1, "The hydrogenated" should be --A hydrogenated--.

Signed and Sealed this

Twenty-third Day of July, 1996

*Attest:*

BRUCE LEHMAN

*Attesting Officer*     Commissioner of Patents and Trademarks